United States Patent Office 3,467,749
Patented Sept. 16, 1969

3,467,749
HYPOCHOLESTEROLEMIC NATURAL PRODUCTS AND THE PREPARATION OF SUCH FROM THE LIVERS OF STARVED MAMMALS
William H. Cevallos, Devon, William L. Holmes, Rosemont, and Richard I. Rubinstein, Melrose Park, Pa., assignors to Smith Kline & French Laboratories, Philadelphia, Pa., a corporation of Pennsylvania
No Drawing. Filed July 14, 1966, Ser. No. 565,086
Int. Cl. A61k *17/00;* C07g *17/00*
U.S. Cl. 424—106       6 Claims

ABSTRACT OF THE DISCLOSURE

A fraction isolated from the liver mitochondria of starved mammals has been demonstrated to have hypocholesterolemic activity. The methods used in isolation and purification are characterized by an acetone treatment to disrupt the cell structure of the excised mitochondrial tissue and final chromatographic purification over a phosphoric acid polystyrene resin column.

---

This invention relates to a new product isolated from liver mitochondria and to novel methods for preparing said product.

The prior art, see Canadian J. Biochem. 42, 105 (1964), describes a natural fraction isolated from liver mitochondria of starved mammals which inhibits the synthesis of cholesterol in mammals at some stage of biosynthetic sequence prior to the formation of mevalonate. This material was prepared by (1) excising the livers of various starved mammals especially rats; (2) homogenization of the pooled livers to isolate the mitochondria; (3) sonification of the mitochondrial tissue to disrupt the cell structure; (4) electrodialysis or trypsin treatment of the sonified issue to remove protein matter; and finally (5) chromatography over a dry cellulose column to purify the fraction. This material is administered to mammals to interrupt the biosynthesis of cholesterol as stated, thereby causing a hypocholesterolemic effect. This fraction had an $R_f$ value of 0.91 referred to alanine on #3 Whatman paper in butanol-acetic acid-water (12:3:5) solvent system.

We have unexpectedly found that by using a modified procedure which is more advantageous for commercial manufacture, we can produce a purified product having a $R_f$ value of 0.54 compared with leucine or 1.0 compared to alanine which is an active cholesterol lowering agent in vivo, but which does not interrupt the biosynthetic cycle. We believe that this new factor may be active by reason of increasing the catabolic rate of cholesterol in the liver, a mechanism which has a therapeutic advantage over interrupting the natural biosynthetic cycles of the body.

The modified process of this invention comprises the following steps: (1) excising the livers of starved mammals; (2) homogenization to isolate the mitochondria; (3) acetone treatment to disrupt the cell structure; (4) electrodialysis to separate the inactive protein matter; and (5) chromatography by thin layer or special column technique to obtain a fraction with an $R_f$ value of 0.54 related to leucine. It will be appreciated that the claimed process differs from the prior art in two major aspects: first, by using an acetone treatment rather than a trypsin or sonification step to disrupt the cell structure of the miochondrial tissue; and second, by isolating by chromatography a final active fraction which differs reproducibly from that previously reported.

The active protein-free liver mitochondrial factor (L.M.F.) of this invention is an amorphous, brown powder which gives a positive ninhydrin test, is of a polypeptide and cationic nature, is soluble in water but insoluble in water but insoluble in normal organic solvents. The $R_f$ value as noted is a critical distinguishing factor for this product.

The factor may be isolated from the livers of any starved mammal such as those excised from rats, sheep, rabbits, or pigs.

The following example will illustrate the operation of this invention in detail for those skilled in the art.

ISOLATION OF MITOCHONDRIA

Male rabbits, 2–2.5 kg., are fasted for 48 hours and sacrificed. The livers are exercised immediately, washed under cold water, trimmed, dried, weighed and cooled in crushed ice. Homogenization at 4° C. in a Waring Blendor is carried out by placing slices of liver in 2 volumes of 0.25 M. sucrose—0.044 potassium phosphate buffer at pH 7.2 bringing the blender gradually up to top speed and maintaining the speed for 90 seconds. The homogenate is filtered through cheesecloth and centrifuged at $650 \times g$ for 10 minutes. The supernatant liquid which contains the mitochondria, microsomes, and soluble components is decanted through cheesecloth, then sedimented in a centrifuge equipped with a Szent-Gyorgy-Blum continuous flow apparatus ($34,000 \times g$). The mitochondrial pallet is resuspended in buffer up to one-half the volume of the original homogenate. The suspension is centrifuged at $650 \times g$ for 10 minutes to sediment any remaining nuclei or red blood cells. The resulting pellet is discarded and the supernatant liquid is decanted into 250 ml. polyethylene bottles for centrifuging at $9,000 \times g$ for 20 minutes to obtain a mitochondrial pellet free from microsomes.

PROCEDURE FOR DISRUPTING THE MITOCHONDRIA

The pellet is suspended in cold acetone (−10° to −15° C.) and homogenized for 15–20 seconds. The "acetone powder" is allowed to settle for 15 minutes in a breaker, then is resuspended in 500 ml. of acetone at −10° to −15° C. After Buchner filtration, the cake is washed with acetone to give a dry tan powder which is stored at 0° C. The yield is 1.153% of fresh liver weight (average yield from 38 preparations using 1260 rabbits).

ELECTRODIALYSIS FOR PROTEIN SEPARATION

A Bradford Electrodialyzer is used consisting of three compartments, two end compartments having a nickel cathode and a platinum black-coated aluminum anode respectively and a center compartment separated from the electrode compartments by cellulose dialysis membranes. The end compartments are filled with de-ionized water, the center with an aqueous solution of mitochondrial acetone powder (33 mg./100 ml.). The power supply is set to 400 volts and the current rises rapidly to 150 ma., then tapers off to 35–40 ma. after about 2½ hours.

The cathode solution is collected (pH 9–11.5) and titrated to pH 6.0 with 1 N hydrochloric acid. The solution is evaporated in vacuo to give a tan, protein-free powder which possesses potent hypocholesterolemic activity (0.22% of fresh liver weight).

PURIFICATION-THIN LAYER CHROMATOGRAPHY

The protein-free material prepared via the acetone powder is dissolved in water and applied to microcrystalline cellulose [Ind. & Eng. Chem. 54 (9), 20–29 (1962)] developing with butanol, acetic acid, water (12:3:5) for 16 hours. The developed fractions are located by positive ninhydrin test, then are removed using extraction with distilled water. A typical spectrum of fractions arranged by $R_f$ values compared to that of leucine is as follows: A=0.08, B=0.20, C=0.38, D=0.54, E=0.69, F=0.74, G=0.81 and H=0.98.

On the basis of biological results which are presented hereafter, fractions C and D with $R_f$ values of from about 0.38–0.54 are rechromatographed over microcrystalline cellulose using butanol-acetic acid-water (12:3:5) to give the purified new L.M.F. agent with an $R_f$ value of 0.54 as a tan amorphous solid which has been described herebefore.

The hypocholesterolemic activity of the various fractions obtained by this new method is as follows:

Groups of 8 male Carworth rats of average weight of 66 g. maintained on special diets are administered the doses I.P. A control group is also treated with saline as indicated. The animals are sacrificed 4 hours after administration and plasma and liver cholesterol values are determined. The dosage of the crude protein-free fraction prepared from the acetone powder is at 50 mg./kg., that of the separated fractions all at 25 mg./kg. The results obtained are summarized in Table I.

is lyophilized, then dissolved in 4 ml. of water for reapplication to the cation exchange column which had been reactivated with 200 ml. of 1 N hydrochloric acid followed by 500 ml. of water. Elution is accomplished with 0.001 N hydrochloric acid in 5 ml. fractions collected at a rate of 1 ml. per minute. The column is monitored by amino nitrogen determinations (see Moore, S and Stein, W. H., J. Biol. Chem. 211 893 (1954)). Three distinct amine containing peaks are obtained. First at tubes 500 –110 containing components C and D; second at tubes 111–150 containing component C; and third at tubes 151–200 containing L.M.F. component D free of contaminants. The D fraction is tested by thin layer chromatography as described above and is revealed to be a homogenous material having an $R_f$ value of 0.56 relative to the leucine identical to the L.M.F. prepared using thin layer of chromatography.

The three fractions are tested in groups of 8 rats for cholesterol lowering activity at 25 mg./kg. intraperitoneally in 0.5 ml. saline with the data summarized in Table II.

TABLE II

| Control | 63.6±8.6 | | | 2.525±0.235 | | |
|---|---|---|---|---|---|---|
| D | 50.6±3.8 | −20.4 | 2 | 1.896±0.133 | −24.9 | 1 |
| C+D | 69.4±9.0 | +9.1 | 6 | 2.281±0.174 | −9.6 | 4 |
| C | 66.0±11.7 | +3.7 | 6 | 2.311±0.232 | −8.5 | 5 |

What is claimed:
1. The method of preparing a natural hypocholester-

TABLE I

| Factor | Plasma cholesterol, mg. percent±S.D. | Percent change from control | p Value | Liver cholesterol, mg./ kg.±S.D. | Percent change from control | p Value |
|---|---|---|---|---|---|---|
| Control | 93.8±9.0 | | | 2.40±0.34 | | |
| Crude | 69.0±6.4 | −26.4 | 1 | 1.69±0.13 | −29.6 | 1 |
| A | 84.8±6.0 | −9.6 | 4 | 2.19±0.18 | −8.8 | 5 |
| B | 92.2±10.6 | −1.7 | 5 | 1.19±0.07 | −20.4 | 2 |
| C | 83.2±10.4 | −11.3 | 4 | 1.99±0.11 | −17.1 | 2 |
| D | 75.0±5.6 | −20.0 | 1 | 1.74±0.16 | −27.5 | 1 |
| Control | 71.5±13.9 | | | 1.85±0.19 | | |
| Crude | 55.8±3.6 | −21.9 | 2 | 1.54±0.12 | −16.8 | 1 |
| E & F | 74.5±8.9 | +4.1 | 5 | 1.91±0.21 | +3.2 | 5 |
| G | 69.5±9.2 | −2.8 | 5 | 1.87±0.16 | +1.0 | 5 |
| H | 74.4±10.4 | +4.0 | 5 | 2.10±0.16 | +13.5 | 3 |
| Control | 80.6±5.8 | | | 2.59±0.27 | | |
| Crude | 55.9±2.4 | −30.6 | 1 | 1.89±0.09 | −27.1 | 1 |
| C | 73.0±7.2 | −9.4 | 4 | 2.30±0.22 | −11.1 | 4 |
| C pure | 65.0±6.1 | −19.4 | 1 | 2.13±0.22 | −17.8 | 2 |
| D pure | 53.4±9.0 | −33.7 | 1 | 1.91±0.06 | −26.2 | 1 |

A $p$ value of 1 or 2 is considered highly significant in the above noted results. It will be apparent that the crude protein-free fraction itself has significant activity. Also that purified fraction D of $R_f$ value 0.54 is the most active fraction since it equals or excels the activity of the crude protein-free fraction prepared from the acetone powder at one-half the dose. The latter fraction has demonstrated significant activity upon administration of dosage units of 12.5, 25, 50, 100 and 400 mg./kg. I.P. to rats. A dose of 5.0 mg./kg. gave no significant activity.

PURIFICATION-ACID COLUMN CHROMATOGRAPHY

In order to prepare larger amounts of the purified L.M.F. agent, column chromatography using an acid resin of intermediate strength is employed.

A column 50 cm. by 1.2 cm. is prepared using an intermediate strength acid resin usually of the styrene-divinyl benzene lattice type containing phosphoric acid difunctional groups (for example, Bio-Rex 63, Rio-Rad Laboratories, Richmond, Calif.). The column is converted from the sodium or salt form to the hydrogen or acid form by washing with 1 N hydrochloric acid followed by a water wash until free of chloride ions.

One gram of crude protein-free L.M.F. material prepared as described above is dissolved in 15 ml. of water, titrated to pH 2.5 and applied to the column. The column is washed with 400 ml. of distilled water. An initial crude resolution is accomplished by adding 500 ml. of 0.01 N hydrochloric acid. The crude D solution thus obtained olemic fraction from mitochondria comprising excising the livers of starved mammals to give the crude liver tissue, isolation of the mitochondrial tissue from the excised livers by homogenization, acetone treatment of the mitochondrial tissue to disrupt the cell structure, separation of the acetone treated mitochondrial material from inactive protein matter by electrodialysis and then chromatographic fractionation of said crude mitochondrial material over an intermediate acid strength cationic exchange resin to give a mitochnondrial fraction having a $R_f$ value of about 0.54 related to leucine in a butanol, acetic acid, water (12:3:5) system obtained by thin layer chromatography over microcrystalline cellulose and having cholesterol lowering activity.

2. The method of claim 1 in which the resin is a phosphoric acid polystyrene resin, acid form.

3. The hypochloesterolemic fraction having an $R_f$ value of 0.54 related to that of leucine in butanol, acetic acid, water (12:3:5), being a tan amorphous powder insoluble in ordinary organic solvents, soluble in water, being of polypeptic and cationic nature, which gives a positive ninhydrine test and which fraction is prepared by the method of claim 1.

4. In the method of isolating a hypocholesterolemic fraction from the liver mitochondria of starved mammals comprising excising the livers of the mammals, isolation of the mitochondrial tissue therefrom by disruption of the cell structure of the mitochondrial tissue, separation of the inactive protein material therefrom and chromatographic purification of the fraction over an intermediate acid strength cationic exchange resin, the improvement comprising using acetone treatment for disrupting the cell structure of the mitochrondial tissue.

5. The method of claim 4 further characterized by the fact that the chromatographic purification is continued until a single fraction is present, having an $R_f$ value of 0.54 related to that of leucine in butanol, acetic acid, water (12:3:5) obtained by thin layer chromatography over microcrystalline cellulose.

6. The method of claim 5 in which the cation exchange resin is a phosphoric acid polystyrene resin, acid form.

References Cited

Migicovsky, Canadian J. Biochem., 42, pp. 105–110 (1964).

ALBERT T. MEYERS, Primary Examiner

S. J. FRIEDMAN, Assistant Examiner